United States Patent [19]

Haselbauer

[11] 4,020,205
[45] Apr. 26, 1977

[54] STRUCTURAL CORES

[75] Inventor: Philip J. Haselbauer, Newport News, Va.

[73] Assignee: The United States of America as represented by the Secretary of the Army, Washington, D.C.

[22] Filed: June 13, 1975

[21] Appl. No.: 587,007

[52] U.S. Cl. .................. 428/116; 46/1 L; 52/DIG. 10; 244/117 R; 123; 273/155; 428/178; 179

[51] Int. Cl.² .......................................... B32B 3/12

[58] Field of Search .......... 428/116, 174, 178, 179; 52/DIG. 10; 35/72; 46/1 L; 93/84 R; 273/155; 244/123, 117 R

[56] References Cited

UNITED STATES PATENTS

| | | | |
|---|---|---|---|
| 3,237,362 | 3/1966 | Fromson | 52/615 |
| 3,642,566 | 2/1972 | Figge | 156/196 X |
| 3,645,833 | 2/1972 | Figge | 428/107 |
| 3,657,059 | 4/1972 | Figge | 428/110 |
| 3,689,345 | 9/1972 | Figge et al. | 428/179 X |
| 3,746,345 | 7/1973 | Palazzolo | 52/DIG. 10 |
| 3,749,636 | 7/1973 | Tranquillitsky | 52/615 X |
| 3,813,273 | 5/1974 | Loustau | 156/469 |

*Primary Examiner*—George F. Lesmes
*Assistant Examiner*—Henry F. Epstein
*Attorney, Agent, or Firm*—Nathan Edelberg; Norman L. Wilson, Jr.

[57] ABSTRACT

Structural cores are quasi-isotropic load-carrying constructional elements in the form of parallel rows of polyhedrons disposed in alternating sequence. These have been made from interwoven fibrous filaments, coated with plastic. Such structural cores are made herein from a continuous ribbon.

3 Claims, 7 Drawing Figures

STRUCTURAL CORES

BACKGROUND OF THE INVENTION

This invention is concerned with constructional elements known generally as structural cores. Specifically the invention relates to a core medium which replaces quasi-isotropic surfaces, or constructional cores of the honey comb type.

Structural cores are the subject of several U.S. Pat. Nos. such as 3,689,345, 3,813,273 and 3,642,566. These cores are in the form of open-ended polyhedrons joined together along common edges or sides. Such structural core media are generating high industrial interest because of the great strengths they possess relative to their weights. Aircraft constructional cores, for example, must possess quasi-isotropic load-carring capabilities, including tension, compression, bending and torsional rigidity. Structural core media thus have many uses in the aircraft and other fields.

The structural core medium with which this invention is concerned is similar to that described in U.S. Pat. Nos. 3,645,833 and 3,657,059. A core of interwoven fibrous filaments is described, coated with plastic to make the core medium. The ultimate core medium is highly satisfactory. However, it is subject to the disadvantage that the fiberous filaments must be wound on a jig to form the interwoven filament core.

SUMMARY OF THE INVENTION

In accordance with the practice of this invention a core medium such as that made heretofore from fibrous filaments is made from a continuous ribbon. The ribbon is cut into two or more bendable strips. These strips, having lateral offset sections of one width dimension along the lengths thereof, are bent to form triangular sides and occluded dihedral angles of tetrahedrons and octahedrons. The bent strips are then joined to form rows of alternate open-faced tetrahedrons and octahedrons. The octahedrons and tetrahedrons in one row are in offset sequential relation to the tetrahedrons and octahedrons in an adjacent row. A core medium is thus provided which includes a series of ribbon strips having deformable sections of uniform width and lateral offset sections along the length thereof. Strips are bent to form sides, and dihedral angles, of polyhedrons, and two or more strips are then joined together to form rows of completed open-faced polyhedrons.

DETAILED DESCRIPTION OF THE INVENTION

It will be seen that in a preferred embodiment of the invention a series of ribbon strips are bent and joined to form a quasiisotropic surface made of rows of alternate open-faced tetrahedrons and octahedrons. The nature of these strips, the method of bending them, and manner of joining strips together can be best explained by reference to the accompanying drawings.

FIG. 1 is a side view of portion of a strip showing bend lines.

FIGS. 2, 3, and 4 are fragmentary plan views of bent views of bent strips.

Figure 1:
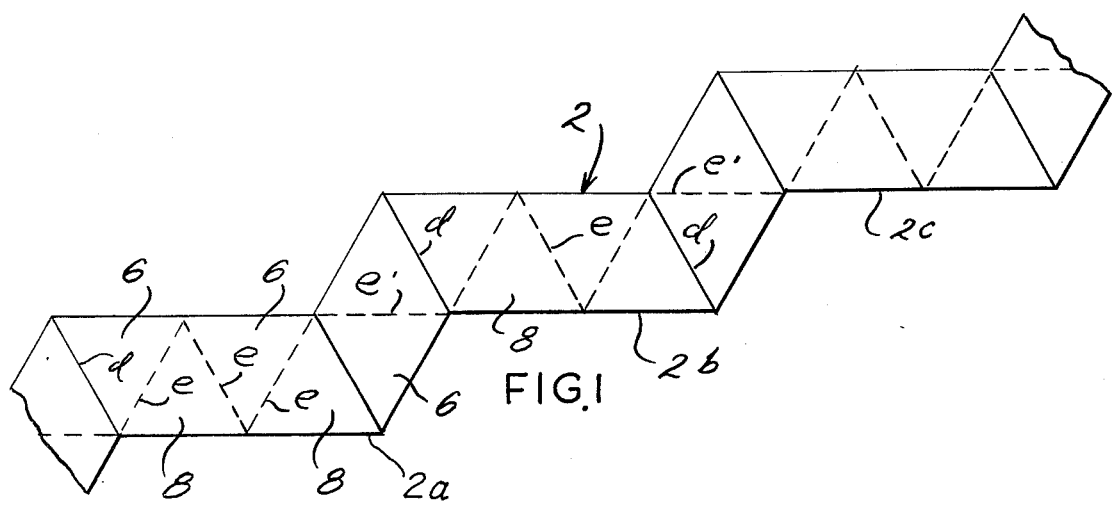

Referring now to FIG. 1, in this aspect of the invention a strip of continuous ribbon 2 is in the form of sections 2a 2b and 2c provided with bend lines $d$ and $e$ defining alternate inverted and upright equilateral triangles 6 and 8. These triangles have common sides, shown as solid bend lines $d$ and dotted bend lines $e$ therebetween.

It will be observed that confined within each section 2a, 2b or 2c are six equilateral triangles. Adjoining sections (e.g. 2a and 2b) are laterally offset one width dimension along the length of the ribbon. In order to effect this offset mode, superimposed above the last triangle 6 of one section (for instance section 2a), with a common side $e'$ therebetween, is the first triangle 8 of a subsequent section (2b), forming the continuous ribbon.

Consideration will now be accorded the bending of the strips to form partial polyhedrons. By bending, of course, is meant the inflecting of the strip to form permanent deformations between triangular surfaces, with no warped faces. It is understood that the bend may be either abrupt or rounded, and that bendable materials are such high strength to weight materials as aluminum and magnesium alloys, Nomex, (duPont's trademark for a nylon fiber, polyamide paper) fiberglass and graphite composites, and plasters. However any material which bends, with or without the application of heat, with permanent set, i.e. without springback and rupture, can be employed.

The bending of the ribbon is effected so as to form two different strips which are conversely bent. Considering the triangular surfaces shown in FIG. 1, bending involves only two rather specific and generally oppositely directed dihedral angles. Referring to FIG. 1, it has been noted that common sides between designated triangles have been identified by $d$, $e$ and $e'$. In bending the strip along these bend lines to form equilateral triangular surfaces, ideally dihedral angles of 70°32' or 109°28' are formed. Latitude is of course possible so long as sides mate when two strips are joined as will be described to form a core structure. Variations in triangular size and shape result in simple and compound curvature and variation in core depth. Thus a deviation in the angles of one strip can be compensated for by the deviations in the mating strip. For flat sheets, with equilateral triangular surfaces, bends will approach the ideal.

Considering now the first strip, 10 (FIG. 2) the dihedral angle sizes and directions depend upon whether the bend line in FIG. 1 is a solid $d$ line or a dotted $e$ line. The triangular surfaces on each side of the $d$ lines are angularly disposed relative to each other by bends along a line $d$ so that dihedral angles $g$ of 70°32' are formed, and so that each angle opening faces virtually the same direction. The common sides between triangular surfaces form the vertices of the dihedral angles. The triangular surfaces on each side of bend line $e$ and of section-connection bend line $e'$ are disposed relative to each other by bends along lines $e$ and $e'$ to form dihedral angles $h$ of 109°28', whose openings, in general, face in a direction opposite the openings of the 70°32' dihedral angles. Stated differently, this disposition of the triangular surfaces in any section results in the formation of two terminal and three internal dihedral angles, the terminal dihedral angles facing in one direction, the internal dihedral angles opening in the opposite direction. The superimposed triangular surfaces forming a dihedral section-connecting angle along bend line e' open in the same general direction as the internal dihedral angles. The first structural core element is thus formed from a strip 10 having at least two offset sections such as 2a and 2b, wherein the terminal angles g are 70°32' dihedral angles and wherein the internal and section-connecting angles h are 109°28' dihedral angles.

To form the second structural core element a second strip, 12, (FIG. 3) is conversely bent, that is the terminal angles g are 109°28' dihedral angles, and the internal and section connecting angles h are 70°32' dihedral angles. In other words, the same general angle disposition applies to strip 12 but the bends are the converse of those in strip 10. By "in general" and "virtually" we allow for the slight non-linearity of angle disposition as seen in FIGS. 2 AND 3.

Figure 5:
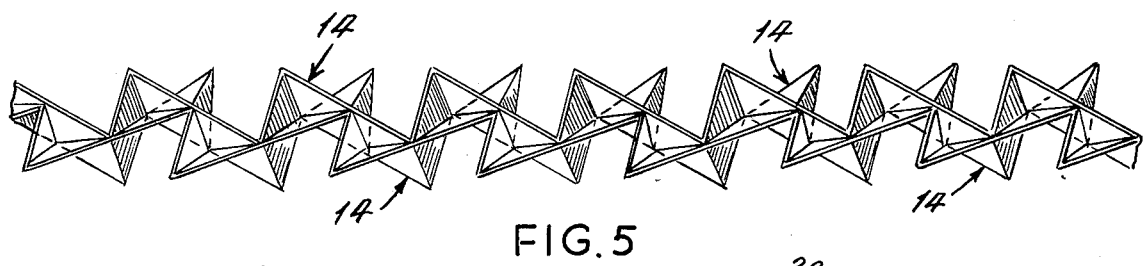
FIG. 5 is a fragmentary view showing the strips of FIGS. 2 and 3 joined to form tetrahedrons.
Figure 6:
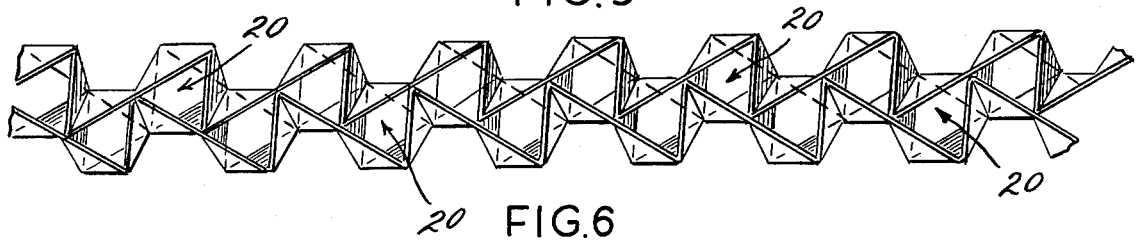
FIG. 6 is a fragmentary view showing the strips of FIGS. 3 and 4 joined to form octahedrons.

Having described the formation of the two strips or core elements 10 and 12 shown in FIGS. 2 and 3, a two element truss or structural core medium will now be described. As illustrated in FIGS. 5 and 6 there are two ways core elements 10 and 12 can be joined with the apices of their dihedral angles in abutment. As seen in FIG. 5 the two core elements 10 and 12 can be joined by sliding element 10 against 12. The elements of FIGS. 2 and 3 when pushed together from their positions shown in the drawings form rows of alternately offset open-faced tetrahedrons 14 as shown in FIG. 5. These rows of open-ended tetrahedrons are formed by using the openings of the 70°32' dihedral angles and the backs of the triangular surfaces formed by the 109°28' dihedral angles. As indicated the dihedral angles h all generally open in the same direction in a particular core element. The triangular surfaces constituting the exterior sides of these dihedral angles form the third sides of the open-ended tetrahedrons. The abuting bend lines can then be joined by soldering, welding, gluing etc.

Figure 2:
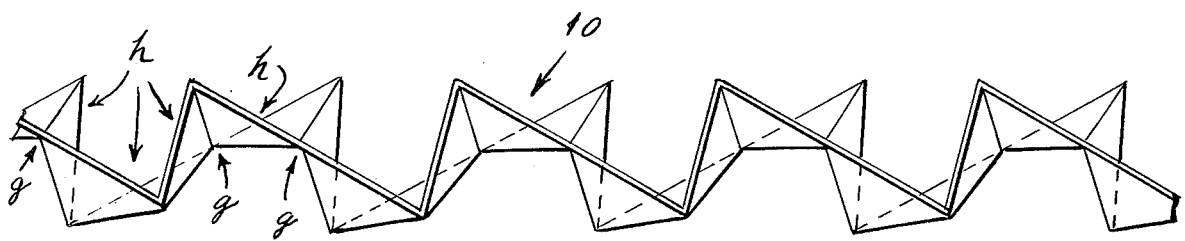
Figure 3:
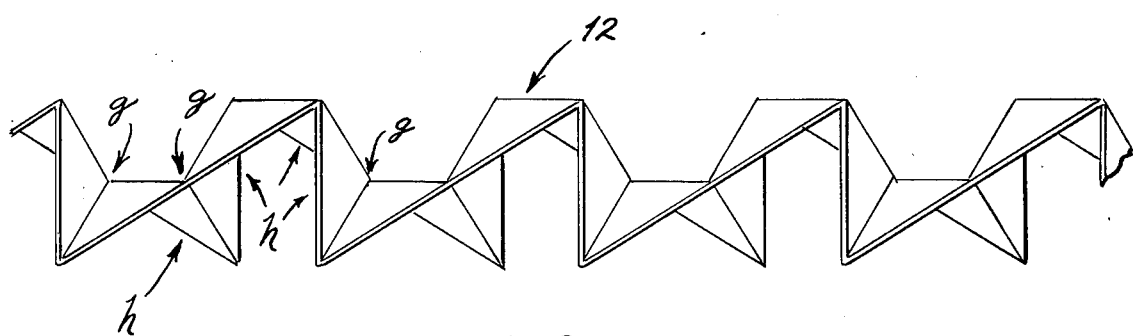
Figure 4:
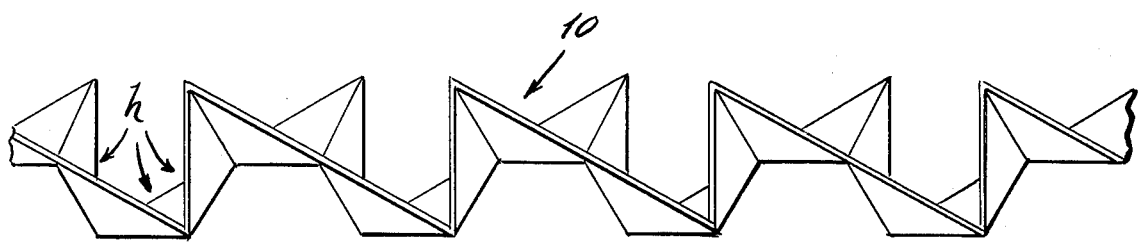

If core element 10 of FIG. 2 is removed to the opposite side of core element 12 of FIG. 3, as it is in FIG. 4, openended octahedrons 20 shown in FIG. 6, rather than tetrahedrons, will be formed. In this instance structural element 10 is joined to the opposite side of element 12 (visualized by pushing the structural elements as drawn in FIGS. 3 and 4 together). On joining strips 12 and 10 of FIGS. 3 and 4 the series of three 109°28° dihedral angles g of the other core element. When core elements 12 and 10 are thus aligned, the bend lines e of core element 12 are in abutment with those of core element 10 so that they can be glued, welded or otherwise joined together.

Figure 7:
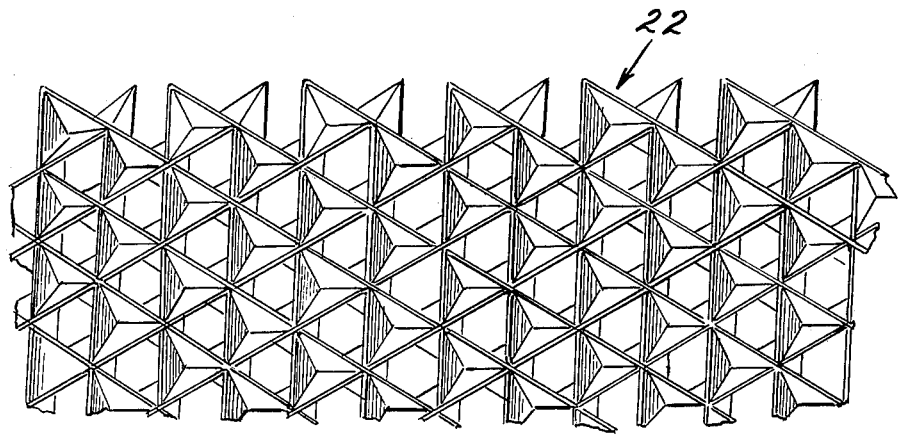
FIG. 7 is a fragmentary view of a portion of a completed structural core medium.

It will be appreciated that two core elements, joined as shown in FIGS. 5 or 6, constitute a structural core. If desired panels can be secured on the sides of these cores to form box-like structural members. Where larger structural cores are desired additional core elements 10 and 12 will be alternately disposed and secured as described in conjunction with FIGS. 2, 3, 4, 5, and 6. The inclusion of additional core elements results in the formation of rows of open-ended tetrahedrons 14 and octahedrons 20 as well as columns of these polyhedrons. The result is rows of tetrahedrons 14 and octahedrons 20, with polyhedrons in each row being in offset sequential relation to the polyhedrons in an adjacent row as in structural core 22 shown in FIG. 7.

It can be seen that there is provided herein a structural core formed from a continuous ribbon rather than from coated fibers. The ribbon is in the form of a series of bendable sections of uniform width, each section being at least six times as long as it is wide. Adjacent sections are offset from each other one width dimension along the length of the ribbon. A preferred application of the invention is the provision of an improved high strength and high rigidity per unit weight core structure for aircraft sandwich structures, such as wings, rotor blades, skin and floor panels. The structural core medium has multidirectional strength properties rendering it useful in other applications as well. Whereas the tetrahedrons and octahedrons shown are formed from equilateral triangles, variations in triangle size and shape, taking care that abutted bend lines match in length, will result in curvature and variation in core depth. In addition whereas a single layer of the structural core is shown, superimposed layers, with or without panels therebetween, can be fabricated. Further, structural elements 10 and 12 can be molded using plastic materials. These and other variations will occur to one skilled in the art. Such modifications are deemed to be within the scope of this invention.

What is claimed is:

1. A structural core medium formed from structural core elements,
each structural core element being a strip formed from a continuous ribbon, the ribbon being in the form of a series of offset sections, each section having bend lines defining the sides of six alternate upright and inverted triangular surfaces having the bend lines as common sides therebetween, the last triangular surface of each section having superimposed thereabove, with a common side therebetween, the first triangular surface of a subsequent section to form the next offset section, the triangular surfaces of each section being angularly disposed relative to each other by bends along the bend lines to form dihedral angles, the common sides between triangular surfaces forming the vertices of the dihedral angles, the triangular surfaces of each offset section forming two terminal and three internal dihedral angles, the terminal angles opening in one direction, the internal dihedral angles opening in the opposite direction, the superimposed triangular surfaces forming a dihedral section-connecting angle opening in the same general direction as the internal dihedral angles, and at least two offset sections thus bent forming said strip, the structural core medium resulting from two similarly bent strips being joined at their common sides to form a row of alternately offset open-faced tetrahedrons.

2. A structural core medium formed from structural core elements,
each structural core element being a strip formed from a continuous ribbon, the ribbon being in the form of a series of offset sections, each section having bend lines defining the sides of six alternate upright and inverted triangular surfaces having the bend lines as common sides therebetween, the last triangular surface of each section having superimposed thereabove, with a common side therebetween, the first triangular surface of a subsequent section to form the next offset section, the triangular surfaces of each section being angularly disposed relative to each other by bends along the bend lines to form dihedral angles, the common sides between triangular surfaces forming the vertices of the dihedral angles, the triangular surfaces of each offset section forming two terminal and three internal dihedral angles, the terminal angles opening in one direction, the internal dihedral angles opening in the opposite direction, the surperimposed triangular surfaces forming a dihedral section-connecting angle opening in the same general direction as the internal dihedral angles, and at least two offset sections thus bent forming said strip, the structural core medium resulting from two conversely bent strips being joined at their common sides to form a row of alternately offset open-faced octahedrons.

3. A structural core medium formed from structural core elements, each structural core element being a strip formed from a continuous ribbon, the ribbon being in the form of a series of offset sections, each section having bend lines defining the sides of six alternate upright and inverted triangular surfaces having the bend lines as common sides therebetween, the last triangular surface of each section having superimposed thereabove, with a common side therebetween, the first triangular surface of a subsequent section to form the next offset section, the triangular surfaces of each section being angularly disposed relative to each other by bends along the bend lines to form dihedral angles, the common sides between triangular surfaces forming the vertices of the dihedral angles, the triangular surfaces of each offset section forming two terminal and three internal dihedral angles, the terminal angles opening in one direction, the internal dihedral angles opening in the opposite direction, the superimposed triangular surfaces forming a dihedral section-connecting angle opening in the same general direction as the internal dihedral angles, and at least two offset sections thus bent forming said strip, the structural core medium resulting from similarly bent strips and conversely bent strips being alternately joined at their common sides to form alternate rows of offset, open-faced tetrahedrons and octahedrons.

* * * * *